United States Patent [19]

Udagawa

[11] Patent Number: 5,297,807
[45] Date of Patent: Mar. 29, 1994

[54] STEEL LAMINATE GASKET

[75] Inventor: Tsunekazu Udagawa, Ichikawa, Japan

[73] Assignee: Ishikawa Gasket Co., Ltd., Tokyo, Japan

[21] Appl. No.: 996,876

[22] Filed: Dec. 28, 1992

Related U.S. Application Data

[63] Continuation of Ser. No. 449,216, Dec. 12, 1989, abandoned, which is a continuation-in-part of Ser. No. 231,303, Aug. 11, 1988, Pat. No. 4,898,396.

[51] Int. Cl.⁵ .................................. F16J 15/06
[52] U.S. Cl. ..................... 277/235 B; 277/234
[58] Field of Search ........... 277/232, 234, 235 B, 277/236

[56] References Cited

U.S. PATENT DOCUMENTS

| 4,739,999 | 4/1988 | Ishii et al. ............... 277/235 B |
| 4,759,585 | 7/1988 | Udagawa . |
| 4,799,695 | 1/1989 | Yoshino ..................... 277/234 |
| 4,826,708 | 5/1989 | Udagawa . |
| 4,834,399 | 5/1989 | Udagawa et al. .......... 277/234 |
| 4,898,396 | 2/1990 | Udagawa ................. 277/235 B |
| 5,058,908 | 10/1991 | Udagawa ................. 277/235 B |
| 5,076,595 | 12/1991 | Udagawa ............... 277/235 B X |

FOREIGN PATENT DOCUMENTS

| 55-53819 | 12/1980 | Japan . |
| 229037 | 12/1984 | Japan ..................... 277/235 B |
| 61-2285 | 1/1986 | Japan . |
| 61-35266 | 3/1986 | Japan . |
| 160549 | 7/1986 | Japan ..................... 277/235 B |
| 169647 | 7/1986 | Japan ..................... 277/235 B |
| 255251 | 11/1986 | Japan ..................... 277/235 B |
| 2092244 | 8/1982 | United Kingdom ...... 277/235 B |

OTHER PUBLICATIONS

Cherry Steel Laminate Gasket Technical Report 1979 by: Ishikawa Gasket Co., Ltd.

*Primary Examiner*—William A. Cuchlinski, Jr.
*Assistant Examiner*—Scott W. Cummings
*Attorney, Agent, or Firm*—Kanesaka & Takeuchi

[57] ABSTRACT

A steel laminate gasket comprises first, second and third plates. The gasket is provided with a first sealing device for sealing around a cylinder hole, which is integrally formed with one of the first, second and third plates, a second sealing device situated inside the first sealing device, and a third sealing device for sealing around a through hole of an engine. The third sealing device is formed on at least one of the first, second and third plates. Sealing layers are provided between the plates outside the second sealing device relative to the cylinder hole.

8 Claims, 3 Drawing Sheets

STEEL LAMINATE GASKET

CROSS REFERENCE TO RELATED APPLICATION

This application is a continuation of application Ser. No. 449,216, filed Dec. 12, 1989, now abandoned, which is a continuation in part application of Ser. No. 231,303 filed on Aug. 11, 1988, and now U.S. Pat. No. 4,898,396.

BACKGROUND OF THE INVENTION AND RELATED ART STATEMENT

The present invention relates to a steel laminate gasket for an internal combustion engine to securely seal around cylinder holes and through holes.

An internal combustion engine is provided with a plurality of cylinder holes and other holes, such as holes for bolt, water, oil and push rod. When an engine is actuated, high pressure and high temperature are applied to the cylinder holes due to combustion of a fuel, while relatively low pressure and low temperature are applied to the other holes.

In order to properly seal between two engine blocks of an engine, a gasket is situated between the two engine blocks, such as a cylinder head and a cylinder block, and is tightened so that areas around the cylinder holes as well as the other holes are securely sealed. However, since the sealing conditions around the cylinder holes and other holes are different as explained above, it is not easy to securely seal around all the holes.

It has been known that beads are formed around the cylinder holes and other holes to securely seal around the holes. However, in case the beads are simply formed, sealing can not be perfectly made. Namely, while an engine is actuated, leakage may happen around the cylinder holes and other holes.

In some cases, seal rings may be separately attached around holes for water and oil. However, since the seal rings are separately prepared and installed in the gasket, it requires additional cost. Therefore, this method is not practical.

Accordingly, an object of the present invention is to provide a steel laminate gasket which can seal properly around all kinds of holes in an engine.

Another object of the present invention is to provide a steel laminate gasket as stated above, which can be manufactured easily and economically.

Further objects and advantages of the present invention will be apparent from the following description of the invention.

SUMMARY OF THE INVENTION

In accordance with the present invention, a steel laminate gasket is installed in an internal combustion engine having at least one cylinder hole and at least one through hole. The gasket basically comprises first, second and third plates.

The gasket is provided with first and second means for sealing around the cylinder hole, third means for sealing around the through hole, and sealing layers located at least between the first and second plates and between the second and third plates. The first means is integrally formed with one of the first, second and third plates, and includes a base portion, a curved portion situated around the cylinder hole and a flange. The second means is situated inside the first means around the curved portion.

The third means is formed on at least one of the first, second and third plates to securely seal around the through hole when the gasket is tightened. The third means may be a bead.

In one embodiment, the first means is formed on the first plate, and the second means is formed on the second plate. The second means may be a bead.

On the other hand, the first means may be formed on the second plate, wherein the first and third plates do not extend adjacent to the cylinder hole. The second means may be a wire ring or a bead in the form of a ring.

The sealing layers are provided outside the second means relative to the cylinder hole and are made of soft materials to prevent fluid from passing between the plates. Since the sealing layers are not provided adjacent to the cylinder hole, the sealing layers may be made of soft materials which is not strong against heat but effective to fluid. As a result, in the gasket of the present invention, areas around the cylinder holes and areas around the through holes are effectively sealed.

DETAILED DESCRIPTION OF PREFERRED EMBODIMENTS

Figure 1:
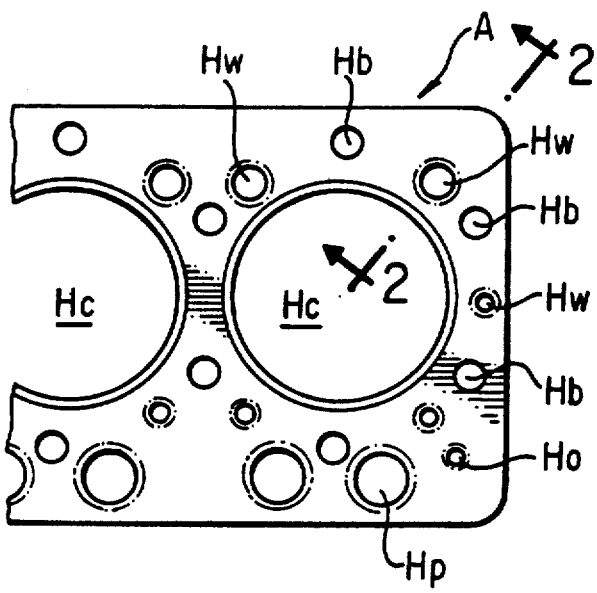
FIG. 1 is a partial plan view of a first embodiment of a steel laminate gasket of the present invention.
Figure 2:
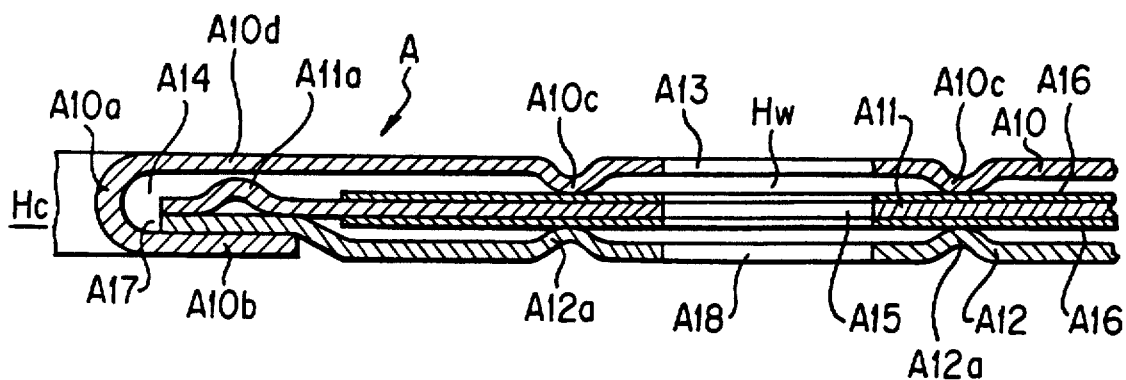
FIG. 2 is an enlarged section view taken along line 2—2 in FIG. 1.
Figure 3:
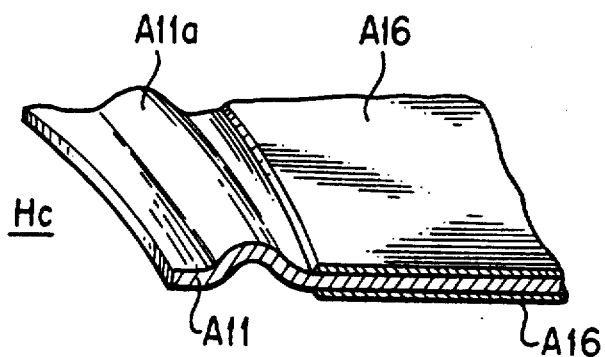
FIG. 3 is a perspective view of a middle plate for constituting the gasket of the present invention.

Referring to FIGS. 1-3, a first embodiment A of a steel laminate gasket of the present invention is shown. The gasket A is provided with cylinder holes Hc, bolt holes Hb, water holes Hw, oil holes Ho and push rod holes Hp, as in the conventional gasket. The areas around the water holes Hw, oil holes Ho and push rod holes Hp are sealed in the same manner. For convenience, the cross section of the water hole Hw and cylinder hole Hc is shown in FIG. 2.

As shown in FIG. 2, the gasket A comprises an upper plate A10, a lower plate A12 and a middle plate A11 situated between the upper and lower plates A10, A12. The upper plate A10 includes a hole A13 for the water hole Hw. Also, the upper plate A10 is provided with a curved portion A10a to define the cylinder hole Hc, a flange A10b, a base portion A10d facing the flange A10b, and a bead A10c around the hole A13. The curved portion A10a seals around the cylinder hole Hc, and the bead A10c seals around the water hole Hw.

The middle plate A11 includes a hole A14 for the cylinder hole Hc, and a hole A15 for the water hole Hw. The middle plate A11 is also provided with a bead A11a adjacent the curved portion A10a, and coatings A16 covering upper and lower surfaces of the middle plate A11. The coatings A16 are not formed at an area adjacent the cylinder hole Hc, i.e. on and around the bead A11a, as shown in FIG. 3.

The coatings A16 are made of soft materials to provide resiliency. Gum, such as NBR gum and silicone gum is preferred, but soft resin may be used. The thickness of the coating A16 is 5-100 micra, preferably 10-50 micra.

The lower plate A12 includes a hole A17 for the cylinder hole Hc, and a hole A18 for the water hole Hw. The lower plate A12 is also provided with a bead A12a adjacent the hole A18 to seal around the water hole Hw. An end portion of the lower plate A12 is situated between the flange A10b and the middle plate A11.

When the gasket A is situated between two engine blocks (not shown) and is tightened, the bead A11a provides sealing pressure around the cylinder hole Hc, while the beads A10c, A12a provide sealing pressure around the water hole Hw.

In the present invention, it is important that the coating is made of a soft material. As a result, the soft material seals properly between the plates to thereby prevent leakage of fluid from the water hole Hw. Also, it is important that the coating is not formed adjacent the cylinder hole Hc. This is because if the coating is exposed to high temperature, creep relaxation of the soft material occurs to cause leakage around the cylinder hole Hc and water hole Hw.

Namely, an effective coating material around the water hole Hw is weak against heat. Therefore, the middle plate is not directly exposed to the cylinder hole, and coatings are formed on the middle plate at an area away from the cylinder hole Hc.

Generally, small scratches are formed on outer surfaces of an engine block when manufacturing the engine block. In order to fill up the small scratches, coatings which are strong against heat may be formed on outer surfaces of the gasket. Therefore, in the present invention, thin coatings may be formed on the outer surfaces of the upper and lower plates A10, A12, which contact the engine blocks.

Figure 4:
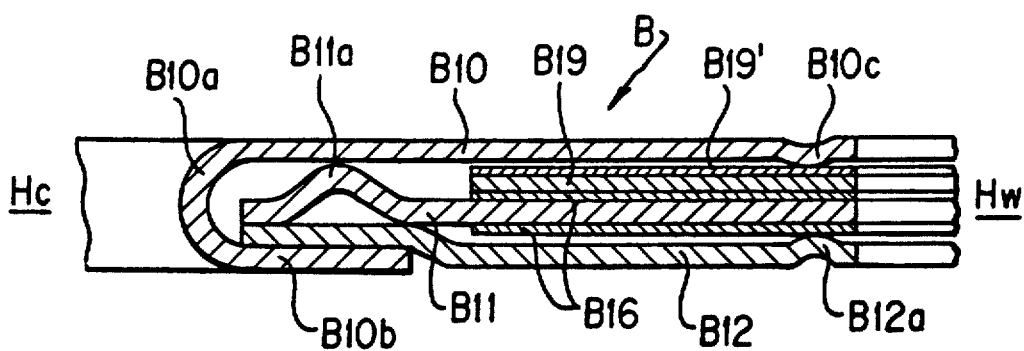
FIGS. 4-7 are section views, similar to FIG. 2, of second to fifth embodiments of a steel laminate gasket of the present invention.

FIG. 4 shows a second embodiment B of a steel laminate gasket of the invention. The gasket B comprises an upper plate B10 with a curved portion B10a, a flange B10b and a bead B10c, a middle plate B11 with a bead B11a, a lower plate B12 with a bead B12a, and coatings B16 provided on both sides of the middle plate B11, similar to the gasket A.

The gasket B is further provided with a surface pressure regulation plate B19 for the bead B11a, which includes a coating B19' similar to the coating A16. In the gasket B, pressure around the cylinder hole Hc is regulated by the plate B19. Also, the coatings are situated between the respective plates, so that liquid does not leak between the plates. An area around the water hole Hw is securely sealed.

Figure 5:
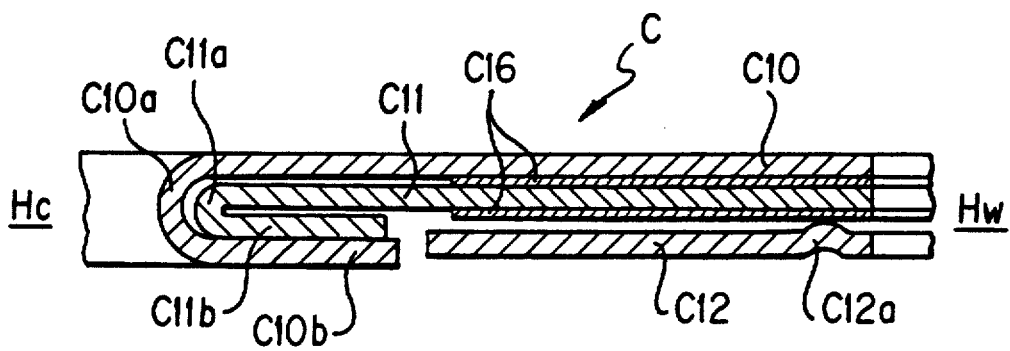

FIG. 5 shows a third embodiment C of a steel laminate gasket of the present invention. The gasket C comprises an upper plate C10 with a curved portion C10a and a flange C10b, a middle plate C11 with coatings C16, and a lower plate C12 with a bead C12a, similar to the gasket A. However, the middle plate C11 is provided with a curved portion C11a and a flange C11b, instead of the bead A11a in the gasket A. Also, an end portion of the lower plate C12 does not engage the flange C10b. Therefore, the lower plate C12 can regulate surface pressure of the flanges C10b, C11b.

In the gasket C, since the curved portion C11a and flange C11b is situated adjacent to the curved portion C10a, when the gasket C is tightened, strong sealing pressure is formed around the cylinder hole Hc. An area around the water hole Hw is securely sealed by the bead C12a. The gasket C is effective when high sealing pressure is required around the cylinder hole Hc.

Figure 6:
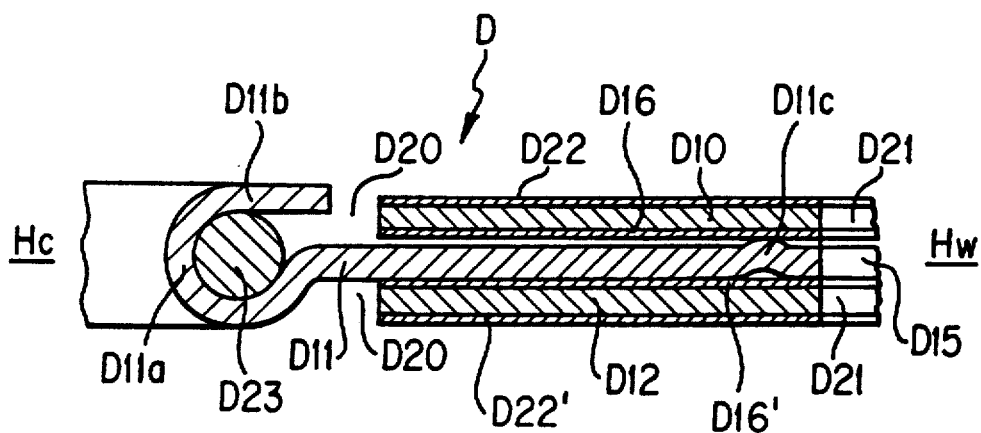

FIG. 6 shows a fourth embodiment D of a steel laminate gasket of the present invention. The gasket D comprises an upper plate D10, a middle plate D11, and a lower plate D12.

The upper and lower plates D10, D12 are similar to each other and have substantially the same structure. Namely, the plates D10, D12 have holes D20 larger than the cylinder hole Hc, and holes D21 for the water hole Hw. The upper plate D10 is provided with a coating D16 at a side facing to the middle plate D11, and a coating D22 at an opposite side thereof, while the lower plate D12 is provided with a coating D16' at a side facing to the middle plate D11 and a coating D22' at an opposite side thereof.

The coatings D16, D16' are the same as the coating A16, which is soft and effective to seal around the water hole Hw. On the other hand, the coatings D22, D22' are strong against heat for filling up scratches of the engine block.

The middle plate D11 is provided with a curved portion D11a situated adjacent to the cylinder hole Hc, a flange D11b, and a bead D11c around a hole D15. A wire ring D23 is provided around the curved portion D11a.

In the gasket D, an area around the cylinder hole Hc is sealed by the curved portion D11a and the wire ring D23, while an area around the water hole Hw is sealed by the bead D11c. Since the soft coatings D16, D16' are provided between the plates, water leakage is substantially prevented. Also, since the soft coatings D16, D16' are formed away from the cylinder hole Hc, the soft coatings are not damaged by heat from the cylinder hole Hc.

Figure 7:
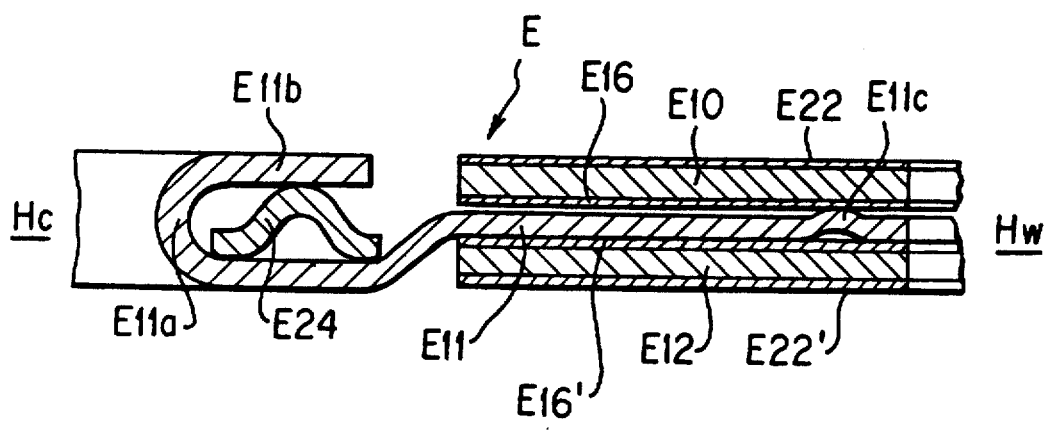

FIG. 7 shows a fifth embodiment E of a steel laminate gasket of the present invention. The gasket E comprises an upper plate E10 with coatings E16, E22, a middle plate E11 with a bead E11c, and a lower plate E12 with coatings E16', E22', similar to the gasket D. The middle plate E11 is also provided with a curved portion E11a and a flange E11b similar to the gasket D, but the entire width of the flange E11b is slightly longer than that of the gasket D.

In the gasket E, a bead E24 in the form of a ring is situated adjacent to the curved portion E11a. Accordingly, when the gasket E is tightened, an area around the cylinder hole Hc is resiliently sealed by the bead E24 and the curved portion E11a. The gasket E operates as in the gasket D.

In accordance with the present invention, the coating material which is weak against heat but effective to seal around fluid holes is provided between plates to be situated away from a cylinder hole. Therefore, areas around the fluid holes can be effectively sealed by even a single bead. Also, an area around the cylinder hole can be effectively sealed.

While the invention has been explained with reference to the specific embodiments of the invention, the explanation is illustrative and the invention is limited only by the appended claims.

What is claimed is:

1. A steel laminate gasket for an internal combustion engine having at least one cylinder hole and at least one through hole therein, comprising:

a first plate having at least one first hole corresponding to the cylinder hole of the engine, and at least one second hole corresponding to the through hole of the engine, a second plate situated under the first plate and having at least one third hole larger than the cylinder hole of the engine, and at least one fourth hole corresponding to the through hole of the engine, a third plate situated under the second plate and having at least one fifth hole larger than the cylinder hole of the engine, and at least one sixth hole corresponding to the through hole of the engine, first means for sealing around the cylinder hole of the engine, said first means being integrally formed with the first plate as one unit so that when the gasket is tightened, an area around the cylinder hole is securely sealed, said first means including a base portion near the cylinder hole to surround the same, a curved portion situated around the cylinder hole and a flange situated near the cylinder hole to surround the same and spaced apart from the base portion, said curved portion interconnecting and being located between the flange and the base portion, said base portion and flange extending radially outwardly from the curved portion, second means for sealing around the cylinder hole, said second means being a bead formed with the second plate and situated between the base portion and the flange of the first means around the curved portion so that the second means and the second plate are not directly exposed to the cylinder hole, third means for sealing around the through hole of the engine, said third means being at least one bead formed on at least one of the first, second and third plates to securely seal around the through hole when the gasket is tightened, a fourth plate located between the first and second plates and situated outside the first and second means to operate as a surface pressure regulation plate for the second means, and sealing layers located between the plates to seal therebetween, at least one sealing layer being provided only on a portion of one side of the second plate that is located outside the second means relative to the cylinder hole, said sealing layers being arranged outside the first and second means relative to the cylinder hole so that the sealing layers are not directly exposed to the cylinder hole, are not excessively heated by the first plate exposed to the cylinder hole and are not compressed by the first and second means thereby preventing creep relaxation of the sealing layers and fluid from flowing between the plates.

2. A steel laminate gasket according to claim 1, wherein said sealing layers are formed on both sides of the second plate.

3. A steel laminate gasket according to claim 1, wherein said one of the sealing layers is fixed to the fourth plate at a side facing the first plate.

4. A steel laminate gasket for an internal combustion engine having at least one cylinder hole and at least one through hole therein, consisting essentially of:

a first plate having at least one first hole corresponding to the cylinder hole of the engine, and at least one second hole corresponding to the through hole of the engine, a second plate situated under the first plate and having at least one third hole larger than the cylinder hole of the engine, and at least one fourth hole corresponding to the through hole of the engine, a third plate situated under the second plate and having at least one fifth hole larger than the cylinder hole of the engine, and at least one sixth hole corresponding to the through hole of the engine, first means for sealing around the cylinder hole of the engine, said first means being integrally formed with the first plate as one unit so that when the gasket is tightened, an area around the cylinder hole is securely sealed, said first means including a base portion near the cylinder hole to surround the same, a curved portion situated around the cylinder hole and a flange situated near the cylinder hole to surround the same and spaced apart from the base portion, said curved portion interconnecting and being located between the flange and the base portion, said base portion and flange extending radially outwardly from the curved portion, second means for sealing around the cylinder hole, said second means being a bead formed with the second plate and situated between the base portion and the flange of the first means around the curved portion so that the second means and the second plate are not directly exposed to the cylinder hole, third means for sealing around the through hole of the engine, said third means being at least one bead formed on at least one of the first, second and third plates to securely seal around the through hole when the gasket is tightened, a fourth plate located between the first and second plates and situated outside the first and second means to operate as a surface pressure regulation plate for the second means, and sealing layers provided on the second and fourth plates to seal between the plates, one sealing layer provided on one side of the second plate being located only outside the first and second means relative to the cylinder hole, said sealing layers being arranged so that all the sealing layers are not directly exposed to the cylinder hole, are not excessively heated by the first plate exposed to the cylinder hole a and are not compressed by the first and second means thereby preventing creep relaxation of the sealing layers and fluid from flowing between the plates.

5. A steel laminate gasket for an internal combustion engine having at least one cylinder hole and at least one through hole therein, comprising:

a first plate having at least one first hole corresponding to the cylinder hole of the engine, and at least one second hole corresponding to the through hole of the engine, a second plate situated under the first plate and having at least one third hole larger than the cylinder hole of the engine, and at least one fourth hole corresponding to the through hole of the engine, a third plate situated under the second plate and having at least one fifth hole larger than the cylinder hole of the engine, and at least one sixth hole corresponding to the through hole of the engine, first means for sealing around the cylinder hole of the engine, said first means being integrally formed with the first plate as one unit so that when the gasket is tightened, an area around the cylinder hole is securely sealed, said first means including a base portion near the cylinder hole to surround the same, a curved portion situated around the cylinder hole and a flange situated near the cylinder hole to surround the same and spaced apart from the base portion, said curved portion interconnecting and being located between the flange and the base portion, said base portion and flange extending radially outwardly from the curved portion, second means for sealing around the cylinder hole, said second means being formed with the second plate as one unit and including a curved portion and a flange bent back under and closely adjacent to a part of the second plate, said curved portion and said flange of the second means being disposed between the base portion and the flange of the first means around the curved portion so that the second means and the second plate are not directly exposed to the cylinder hole and provide strong sealing pressure when the gasket is tightened, third means for sealing around the through hole of the engine, said third means being a bead formed on at least one of the first, second and third plates to securely seal around the through hole when the gasket is tightened, and two sealing layers located between the plates to seal between the plates, at least one sealing layer being provided only on a portion of one side of the second plate located outside the first and second means relative to the cylinder hole, said sealing layers being arranged so that the sealing layers are not directly exposed to the cylinder hole, are not excessively heated by the first plate exposed to the cylinder hole and are not compressed by the first and second means thereby preventing creep relaxation of the sealing layers and fluid from flowing between the plates.

6. A steel laminate gasket according to claim 5, wherein said flange of the second means is situated closely over the flange formed integrally with the first plate without extending beyond the flange of the first plate.

7. A steel laminate gasket according to claim 6, wherein said two sealing layers are provided on both sides of the second plate outside the first and second means relative to the cylinder hole.

8. A steel laminate gasket according to claim 7, wherein said gasket consists essentially of said first, second and third plates.

* * * * *

UNITED STATES PATENT AND TRADEMARK OFFICE
CERTIFICATE OF CORRECTION

PATENT NO. : 5,297,807
DATED : March 29, 1994
INVENTOR(S) : Tsunekazu Udagawa It is certified that error appears in the above-identified patent and that said Letters Patent is hereby corrected as shown below:

Column 6, line 39, change "a" to --,--.

Signed and Sealed this

Fourteenth Day of March, 1995

Attest:

BRUCE LEHMAN

Attesting Officer      Commissioner of Patents and Trademarks